Sept. 4, 1962  W. J. SHOLD  3,052,215
POULTRY WATERER
Filed March 31, 1961  2 Sheets-Sheet 1
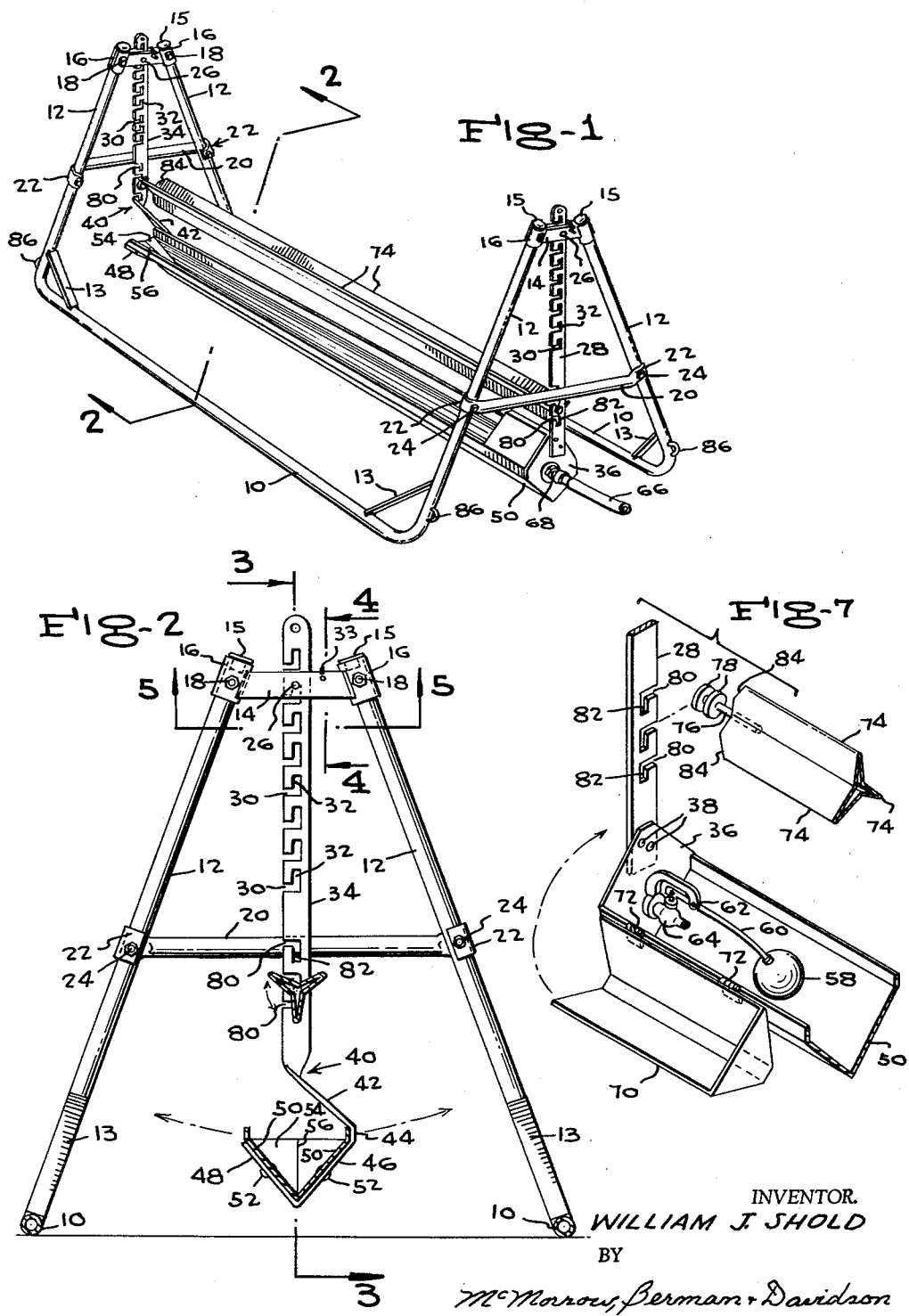
INVENTOR.
WILLIAM J. SHOLD
BY
McMorrow, Berman & Davidson
ATTORNEYS Sept. 4, 1962 W. J. SHOLD 3,052,215
POULTRY WATERER
Filed March 31, 1961 2 Sheets-Sheet 2
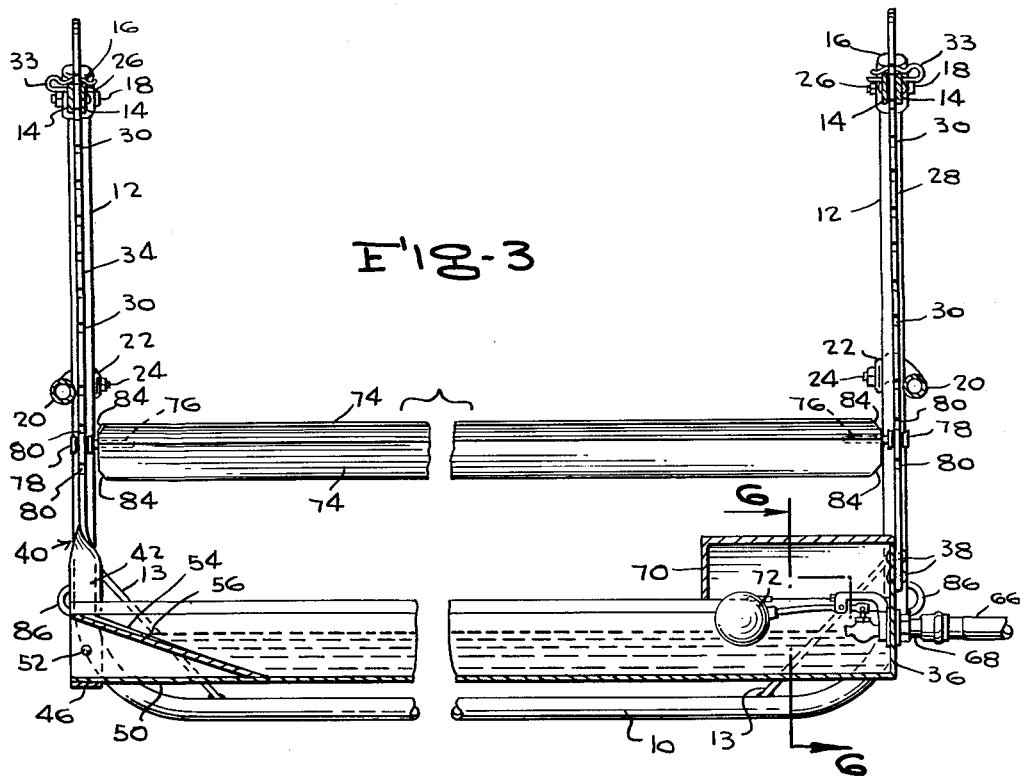
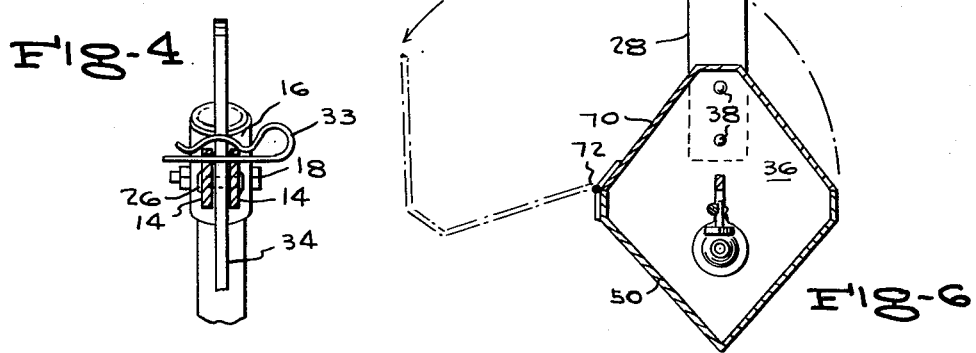
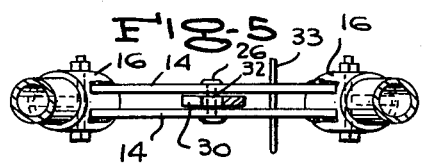
INVENTOR.
WILLIAM J. SHOLD
BY
McMorrow, Berman & Davidson
ATTORNEYS

United States Patent Office 3,052,215
Patented Sept. 4, 1962

3,052,215
POULTRY WATERER
William J. Shold, Marathon, Iowa
Filed Mar. 31, 1961, Ser. No. 99,861
6 Claims. (Cl. 119—78)

This invention relates to watering troughs for poultry, and turkeys in particular, and is concerned with the portable type, for use on the range. In such use, the ground location for the trough is usually sloping, and frequent relocations of the trough, therefore, demand not only a levelling feature but one which is quickly manipulated as well as secure in its adjusted positions. It should also be adjustable in reasonably small increments over a reasonably wide range. Over-all height adjustment is also necessary to compensate for poultry growth. It is also desirable that the trough be emptied and cleaned at frequent intervals.

It is therefore an object of the invention to provide a watering trough which has an improved levelling feature, and particularly one which affords levelling in two directions, a related object being to provide a device of this nature in which the levelling action in one direction is automatic. Another object is to provide a trough which permits of easy drainage and cleaning, and especially when in cooperation with the aforesaid features. A further object is to provide a quick levelling feature in combination with a guard against accidental removal from adjusted position but which does not interfere with automatic self-levelling. Yet another object is to provide a trough having a sled-like supporting framework by virtue of which it may be moved, skid fashion, either singly, or towing several in series. A still further object is to provide easy height adjustment for an anti-roosting reel above the trough. Other objects include the avoidance of sharp corners, which would be injurious to the poultry, and, in general, the provision of a device which is simple in structure, durable, easy of manufacture, low in cost, and certain in operation.

These and other objects, which will be apparent to those skilled in the art, are attained by the present invention, which may be briefly characterized as comprising a sled-like frame, with supporting A sections at the ends, a pair of strap hangers being selectively engageable, as to height, on pins carried by the end sections, by virtue of a series of side-opening L slots, or bayonet slots, to provide a pendulum mounting, one of the straps being secured to a closed end face of a water trough, and the other engaging the sides and bottom of the trough at the other end, so as to avoid obstructing the end, and the unobstructed end having a slant, end wall.

For a detailed description of a preferred embodiment of the invention, reference is made to the following specification, as illustrated in the drawings, in which:

FIGURE 1 is a perspective view of the watering device, as a whole,

FIGURE 2 is a sectional view taken on the plane of the line 2—2 of FIGURE 1,

FIGURE 3 is a sectional view through the central, vertical plane of symmetry, indicated by the line 3—3 of FIGURE 2, FIGURE 4 is a sectionalized, fragmentary view of a detail taken on the line 4—4 of FIGURE 2, and showing the cotter hairpin.

FIGURE 5 is a sectional view taken on the line 5—5 of FIGURE 2,

FIGURE 6 is a sectional view taken on the staggered line 6—6 of FIGURE 3, and

FIGURE 7 is a perspective view of the structure included in the zone covered in FIGURE 6, and showing the valve in its compartment.

Referring to the drawings by characters of reference, there is shown a supporting structure comprising a frame of inverted V form, comprising two sides, each constituted by a single length of tubing, having central, ground-engaging skids 10, and perpendicularly bent, end arms 12, with closure caps 15 in their outer ends, a pair of the arms 12 being secured together, at each end of the frame, in the form of an A section by means of a short, upper cross-piece, and a longer, intermediate cross-piece. Each side of the frame has a pair of corner braces 13. The upper cross-piece comprises a pair of straps 14, welded at their opposite ends to split cylindrical collars 16, each of which is received on the upper end of one of the pair of slant arms 12, to which it is secured by a bolt 18. The cross-pieces 14 are spaced apart sufficiently to receive the supporting pendulum arm of the trough, as will be seen. The intermediate cross-piece 20 consists of a length of tubing, with its two ends 22 flattened and bent into cylindrical form for reception on arms 12, to which they are secured by bolts 24. The innermost point on tube 20 will be located so as not to extend inwardly of a plane tangent to the outer extremities of arms 12, so as not to interfere with the pendulum action.

The pendulum hanger arms, although identical above the trough, are different in structure adjacent thereto, and therefore will be indicated by different reference numerals. The pivot suspension for the pendulum arms is afforded by a pin 26 carried as a permanent mounting by upper cross-pieces 14, and located centrally thereof. The hanger arm 28, to the right in FIGURES 1 and 3, has in its upper extent, a series of equally spaced, side-opening notches 30, communicating with end notches 32 disposed at right angles upwardly from the entering notch, the two constituting a bayonet slot. It will be seen that the arm may be suspended on its swing mounting by inserting it between cross-pieces 14, slipping one of the side notches 30 over the pin 26, and dropping the arm so that vertical notch 32 engages pin 26. To prevent accidental disturbance of the mounting, the upper cross-pieces 14 are bored to receive a cotter hairpin 33 which is so located that the hanger arm cannot be moved sufficiently to withdraw notch 30 from pin 26, but a reasonable arc of swing of the arm is permitted. The hanger arm 34, at the other end of the frames, carries a similar set of notches 30, 32 in its upper portion, functioning in like manner. However, whereas arm 28 is secured to an end face 36 of the trough as by rivets 38, the arm 34 is constructed so as to avoid obstruction to the end of the trough, being twisted through 90° at the region 40, below which it is appropriately bent into successive angularly disposed sections 42, 44, 46 and 48, the latter three to conform to the V shape of the trough 50, and the first to locate the mid line of the trough below the hanger arm. The trough is supported in the cradle formed by sections 46, 48, being secured thereto as by rivets 52.

The trough 50, at its leftward, unobstructed end, has a slant end face 54, of low angle, and top edge flush with that of the V trough to facilitate emptying and cleaning, and this ramp preferably is provided with a small central groove or channel 56 in futherance of the same functions. The right end of the trough houses the feed cock and level control device, consisting of conventional units such as a float ball 58, lever 60, pivot fulcrum 62, and cock 64, the latter being fed by a fluid line 66 attached to a fitting 68 on the end face 36 of the trough. A protective cover for the fluid control is provided in a hood 70 of generally triangular cross-section, secured to the trough by hinges 72.

For discouraging roosting, a vaned reel is mounted for free rotation on an axis above and parallel to the longitudinal extent of the trough, and since the trough is integral with the hanger arms 28 and 34, the reel is journalled in those arms. As best seen in FIGURE 7, the reel comprises three radial vanes 74 at 120° intervals, each formed from a metal sheet bent along a middle line into a small dihedral angle, and the reel being assembled by uniting the vanes edge to edge, so that the apices extend radially. At each end of the reel, a stub shaft 76 is secured in the central, open area, axially of the vane, so as to extend therefrom, each shaft carrying a spool 78 for journalling the reel on the hanger arms. Since height adjustment is important in the case of the reel, as in the case of the trough, the reel is provided with a quick change feature similar to the slots in the upper ends of the hanger arms. However, since in this case the hanger arms are doing the supporting, and the reel is being supported, the slots are disposed in a sense opposite to that of slots 32. Thus, in the lower part of hanger arms 28, 34, side slots 80 communicate with vertical slots 82, which extend downwardly from slots 80 so that the reel shafts are retained against side displacement when dropped into place. The vanes are preferably bevelled, as at 84, at their corners, to avoid injury to the poultry. In fact, exposed, sharp edges or corners should be avoided throughout.

From the foregoing description, the manner of use of the device will be clear. In operation on level ground, the arms 28, 34 will be suspended by a suitable pair of notches so that the trough is parallel to the horizontal sections 10 of the frame. To change stations, the frame may be attached to a towing device, as by loops 86 on the frame, and pulled sled fashion to the desired location. If one of the ground rails 10 is uphill with respect to the other, the arms 28, 34 will swing automatically, to preserve the level attitude of the trough. If both of the ground rails are inclined at an angle to the vertical, the level condition of the trough may be restored by removing the cotter pin from the downhill end of the frame, withdrawing the hanger arm, lifting it the proper amount, and reinserting the proper slot on the pivot pin. In termediate situations, where both the length and the width of the frame are on a slope, one of these slopes is still taken care of automatically, and the other by relocating the downhill hanger arm.

Aside from the adjustment for levelling, it becomes necessary to adjust the height of the trough at times during the growth period of the poultry, and this is easily accomplished by the notches. The reel, of course, is levelled along with the trough, but is provided with extra handling notches to vary its height above the trough during growth of the poultry. The freely rotatable reel is not only effective in discouraging roosting over the trough, but also reinforces the hanger arms against side movement and bending.

The slant end 54 of the trough accomplishes thorough drainage of the trough, without actually having to turn it upside down, or through 90°, and the mid channel 56 in this face further assists drainage. The slant face is also of assistance in cleaning the trough, and the construction of the hanging strap at one end to leave the end free of obstructions enables the free sweep of a cleaning implement from inside the trough to the outside. The structure of the strap at this end also materially reinforces the body of the trough.

Whereas a preferred embodiment has been shown and described, modifications will be apparent to those skilled in the art, in the light of this disclosure, and the invention should not, therefore, be deemed as limited, except insofar as shall appear from the spirit and scope of the appended claims.

I claim:
1. A watering trough assembly comprising:
 (a) a supporting framework including upstanding end frames;
 (b) each of the end frames having fixed pivot means thereon;
 (c) a swingable arm detachably suspended on each of said pivots;
 (d) a plurality of means comprising bayonet slots each having at least two portions, one portion opening to an edge of the arm, formed in each of said arms for detachable connection with said pviot means whereby the arms may be selectively located at various heights with respect to the framework and to one another;
 (e) a trough secured at its ends to the arms; and
 (f) anti-roost means extending between the arms above said trough.

2. A watering trough assembly comprising:
 (a) a supporting framework with a pair of skid rails joined by end A frames, each having a pair of spaced, parallel, cross-rails in its upper portion, with a pivot spanning the space between the rails intermediate the length thereof;
 (b) a pair of swingable arms detachably suspended on said pivots, each having in its upper portion a series of side-opening slots, communicating with slots arranged longitudinally of the arm and opening in the direction of the pivot;
 (c) a removable detent carried by said rails and located in the path of swing of said arms;
 (d) each of said arms having in its lower portion a series of side-opening slots communicating with slots arranged longitudinally of said arm and opening in a direction away from the pivot;
 (e) a trough with upwardly diverging sides secured at its ends to the lower part of said arms, and having a sloping end face reaching the height of the side faces;
 (f) the arm adjacent the said face having a portion connecting with the trough which departs from a plumb line to the trough, and is secured to the trough in underlying relation thereto; and
 (g) a vaned reel having end shafts with spools received in pairs of said slots in the lower portion of said arms.

3. A watering trough assembly comprising:
 (a) a supporting framework with a pair of skid rails joined by end A frames each having a pair of spaced, parallel, cross rails in its upper portion, with a pivot spanning the space between the rails intermediate the length thereof;
 (b) a pair of swingable arms detachably suspended on said pivots, each having in its upper portion a series of side-opening slots, communicating with slots arranged longitudinally of the arm and opening in the direction of the pivot;
 (c) a removable detent carried by said rails and located in the path of swing of said arms;
 (d) each of said arms having in its lower portion a series of side-opening slots communicating with slots arranged longitudinally of said arm and opening in a direction away from the pivot;
 (e) a trough with upwardly diverging sides secured at its ends to the lower part of said arms, and having a sloping end face;
 (f) the arm adjacent the said face having a portion connecting with the trough which departs from a plumb line to the trough, and is secured to the trough in underlying relation thereto; and
 (g) a vaned reel with hollow vanes of dihedral angle cross-section, said reel having end spindles with spools received in pairs of said slots in the lower portion of said arms.

4. A watering trough assembly comprising:
 (a) a supporting framework with a pair of skid rails joined by end A frames, each having a pair of spaced, parallel cross rails in its upper portion, with a pivot spanning the space between the rails;
 (b) a pair of swingable arms detachably suspended on said pivots, each having in its upper portion a series of side opening slots, communicating with slots arranged longitudinally of the arm and opening in the direction of the pivot;

(c) a removable detent carried by said rails adjacent said pivots;

(d) each of said arms having in its lower portion a series of side-opening slots communicating with slots arranged longitudinally of said arm and opening in a direction away from the pivot;

(e) a trough with upwardly diverging sides secured at its ends to the lower part of said arms, and having a sloping end face;

(f) the arm adjacent the said face having a portion connecting with the trough which departs from a plumb line to the trough, and is secured to the trough in underlying relation thereto; and (g) a vaned reel having end spindles received in pairs of said slots in the lower portion of said arms.

5. A watering trough assembly comprising:

(a) a supporting framework with a pair of skid rails joined by end frames, each bearing a fixed pivot in its upper portion;

(b) a pair of swingable arms detachably suspended on said pivots, each having in its upper portion a series of side-opening slots, communicating with slots arranged longitudinally of the arm and opening in the direction of the pivot;

(c) each of said arms having in its lower portion a series of side-opening slots communicating with slots arranged longitudinally of said arm and opening in a direction away from the pivot;

(d) a trough with upwardly diverging sides secured at its ends to the lower part of said arms, and having a sloping end face;

(e) the arm adjacent the said face having a portion connecting with the trough which departs from a plumb line to the trough, and is secured to the trough in underlying relation thereto; and (f) a vaned reel having end spindles received in pairs of said slots in the lower portion of said arms.

6. A watering trough assembly comprising:

(a) a supporting framework with end frames each bearing a fixed pivot in its upper portion;

(b) a pair of swingable arms detachably suspended on said pivots, each having in its upper portion a series of side-opening slots communicating with slots arranged longitudinally of the arm, and opening in the direction of the pivot;

(c) each of said arms having in its lower portion a series of side-opening slots communicating with slots arranged longitudinally of said arm and opening in a direction away from the pivot;

(d) a trough secured at its ends to the lower part of said arms, the arm at one end of said trough having a hooked portion departing from a line from the pivot to the trough; and (e) a vaned reel having end spindles received in pairs of said slots in the lower portion of said arms.

References Cited in the file of this patent
UNITED STATES PATENTS

| 654,427 | Atsatt | July 24, 1900 |
| 3,006,321 | Bailey | Oct. 31, 1961 |